United States Patent [19]
Kutler et al.

[11] 3,925,003
[45] Dec. 9, 1975

[54] GAS FLOW CONTROL SYSTEM

[75] Inventors: Andrew A. Kutler, South Orange, N.J.; Joseph F. Keegel, Jr., St. Croix, V.I.

[73] Assignee: Foster Wheeler Energy Corporation, Livingston, N.J.

[22] Filed: Sept. 5, 1974

[21] Appl. No.: 503,417

[52] U.S. Cl. .............. 431/89; 137/251; 137/505.19
[51] Int. Cl.² .......................................... F23N 1/00
[58] Field of Search ... 431/89, 61; 137/251, 247.11, 137/505.19

[56] References Cited
UNITED STATES PATENTS

| | | | |
|---|---|---|---|
| 2,367,158 | 1/1945 | Ulm ..................... | 137/251 |
| 2,734,562 | 2/1956 | Haberle et al. .................. | 431/89 X |
| 3,605,776 | 9/1971 | Fullam ........................... | 137/251 X |
| 3,852,023 | 12/1974 | Itoh et al. ......................... | 431/89 X |

*Primary Examiner*—Edward G. Favors
*Attorney, Agent, or Firm*—Marvin A. Naigur; John E. Wilson

[57] ABSTRACT

A control system for controlling the flow of a gas through a conduit system, in which a tank is provided which connects two portions of the conduit system and which contains a liquid at a predetermined level which is maintained by a liquid reservoir in communication with the tank. One portion of the conduit system registers with the tank above the liquid level and the other portion of the conduit system communicates with the interior of the tank at a point below the liquid level. As a result, the liquid normally prevents the flow of the gas through the conduit system unless the pressure of the gas is sufficient to displace the liquid from the tank to the reservoir to the extent that the corresponding portion of the conduit system is exposed and placed in communication with the other portion. A charge of inert gas is introduced into the tank to raise the fluid pressure in the tank and prevent diffusion of gas or air through the tank.

6 Claims, 1 Drawing Figure

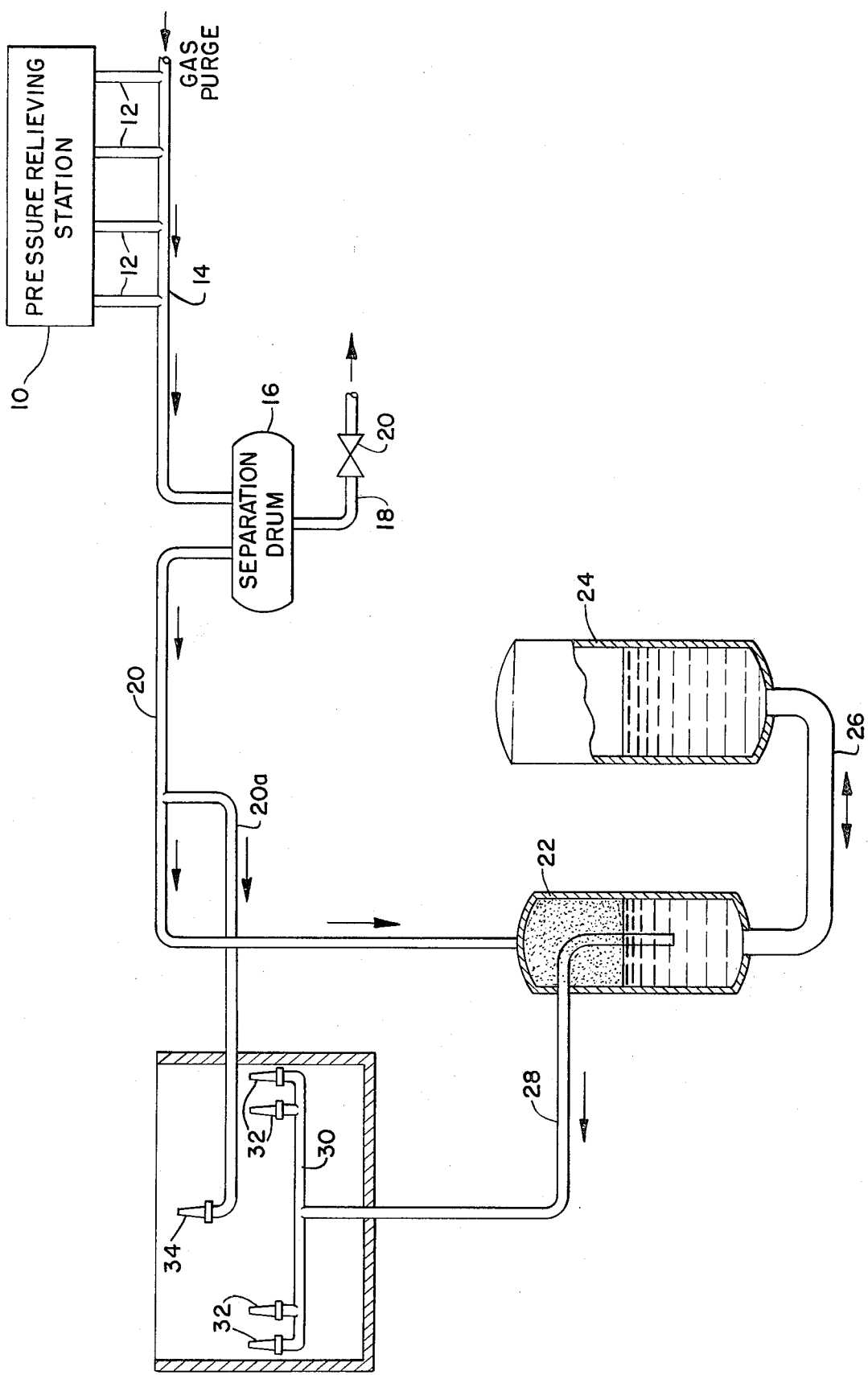

GAS FLOW CONTROL SYSTEM

BACKGROUND OF THE INVENTION

This invention relates to a control system for fluid flow and, more particularly, to such a system employing a liquid seal which normally prevents the flow of fluid through a conduit system, but which permits the flow in response to a predetermined pressure existing in the system.

Several specialized fluid flow control systems exist in which the use of mechanical valves for controlling the flow of the fluid through a conduit or conduits is undesirable. For example, in petrochemical and/or refinery installations, pressure control and relieving stations are provided for vessels containing fluids at relatively high pressures. These stations operate to permit the discharge of a controlled amount of the stored fluid, usually in a gaseous form, to prevent the vessel from overpressurizing. These gases are usually routed through a conduit to a flare, or burner, that combusts the gases.

In these systems, pressure responsive valves must be used in the conduit connecting the relieving station to the burner to permit the gases to flow to the burner in response to a predetermined gas pressure existing in the conduit, yet prevent the flow of air entering the burner in an opposite direction. This latter function is especially critical, since in systems of this type the gases often contain hydrocarbons which, if combined with air, produce an explosive mixture.

It has been discovered that the use of conventional mechanical check valves, or the like, is unacceptable in the above environment, since the valves are subject to deterioration, usually in the form of corrosion or the like, especially when subjected to relatively high temperatures. As a result, air leakage may occur through the valve, especially after a period of use, which increases the chances of an explosion.

SUMMARY OF THE INVENTION

It is, therefore, an object of the present invention to provide a flow control system which is reliable in operation and which insures the flow of fluid in a predetermined manner without the danger of any backflow.

It is a further object of the present invention to provide a flow control system of the above type which permits the flow of gas from a relieving station or the like to a burner for combustion, yet eliminates the possibility of air entering the burner from flowing towards the gas source.

It is a more specific object of the present invention to provide a liquid seal tank communicating with the conduit supplying the gas to the burner and operating to prevent the flow or diffusion of the air back through the conduit.

Toward the fulfillment of these and other objects, the fluid flow control system of the present invention comprises a tank containing a liquid, a reservoir connected to said tank for permitting the introduction and withdrawal of the liquid to and from said tank to maintain said liquid at a predetermined level in said tank, first conduit means connected to a source of a first fluid and communicating with the interior of said tank at a point above said liquid level, second conduit means communicating with a second fluid and communicating with the interior of said tank at a point below said liquid level so the liquid normally prevents flow of either of said fluids from one of said conduit means to the other unless the pressure of said first fluid is sufficient to displace said liquid from said tank to said reservoir to the extent that said first conduit means is communicated with said second conduit means, and means for preventing diffusion of either of said fluids from its respective conduit means through said liquid and into the other conduit means.

BRIEF DESCRIPTION OF THE DRAWINGS

The drawing is a schematic representation of a fluid flow control system of the present invention.

DESCRIPTION OF THE PREFERRED EMBODIMENT

Referring specifically to the drawing, the reference numeral 10 refers in general to a pressure relieving station normally associated with a petrochemical or refining unit, and adapted to receive a fluid from the latter unit to prevent overpressuring of a vessel or the like associated with the unit. The fluid is usually in gaseous form, and can be naphtha, natural gas, hydrogen sulfide, or the like, depending on the particular unit involved.

A plurality of lines 12 connect the pressure relieving station to a conduit 14 which is connected at one end to a source of gas for establishing a purge, as will be explained in detail later, and at the other end to a separation drum 16. The drum 16 is provided to separate any liquid from the gases received from the pressure relieving station, with the liquid being distributed, via a line 18 and a valve 20, to an external location.

A conduit 20 connects the separation drum 16 to the upper end portion of a liquid seal tank 22 for passing the gases from the separation drum 16 to the tank. A reservoir tank 24 is provided in proximity to the tank 22, and a conduit 26 registers with the bottom end portions of the tanks for maintaining them in constant communication. Both of the tanks 22 and 24 contain a liquid, such as water, which normally extends to the same level in each tank and which occupies approximately one half the full volume of each tank. Also, a charge of inert gas is disposed in the upper portion of the tank 22 for reasons that will be explained in detail later.

A conduit 28 is provided which has an end portion extending within the tank 22 below the normal liquid level in the tank, and is connected at its other end to a manifold 30 to which a plurality of burners 32 are connected. The burners 32 are adapted to operate in a conventional manner to continuously burn the gas supplied to them by the conduit 28.

A branch conduit 20a extends from the conduit 20 and is directly connected to a burner 34 for reasons that will be described in detail later.

In operation, a gas purge from an external source is applied through the line 14 and, together with any relatively small amounts of gas from the pressure relieving stations, will pass through the separation drum 16, through a portion of the conduit 20 to the branch conduit 20a, and from the latter to the burner 34 where the gases will be continuously combusted. In the event the quantity of gases from the pressure relieving station 10 increases to the extent that the capacity of the line 20a and the burner 34 is exceeded, the gases will begin flowing through the remaining portion of the conduit 20 and into the tank 22. As the pressure in the tank 22 rises, the liquid in the tank will be forced out into the reservoir 24 through the conduit 26. If this continues to the extent that the end of the conduit 28 within the tank 22 is exposed, the gases will pass directly from the conduit 20, through the tank 22 and into the conduit 28, through which they will pass to the burners 32 for combustion. Of course, after the pressure of the gases in the line 20 later subsides to the extent that the liquid level in the tank 22 rises to a level above the end of the conduit 28, any further direct flow of the gases from the conduit 20 to the conduit 28 will be prevented.

It is noted that when the liquid in the tank 22 is at its normal level, i.e. when it extends above the end of the conduit 28, the charge of inert gas in the tank 22 immediately above the liquid operates to establish a fluid pressure in the tank sufficient to prevent any substantial diffusion of the gas from the line 20, through the liquid in the tank and into the line 28. Also, this pressure will prevent any air entering the burners 32 from diffusing through the liquid in the tank and into the line 20. As stated earlier, prevention of the latter diffusion is particularly important since the gases from the pressure relieving station 10 often contain hydrocarbons which, if combined with air, produce an explosive mixture.

It is thus seen that the system of the present invention provides an effective control of the flow of the gases from the line 20 to the burners 32, yet insures that there will be no undesirable diffusion or mixing of the gases and the air to cause premature combustion.

It is understood that several variations may be made in the above without departing from the scope of the invention. For example, the liquid in the tank 22 and the reservoir 24, although preferably water, can be replaced by glycol or the equivalent. Also, it is understood that liquid in the tank 22 can be maintained at a constant temperature by the application of standard temperature instrumentation, and either external or internal heating apparatus in accordance with conventional practice. Also, this, plus high and low level alarms and a level gauge can be utilized to maintain the proper liquid level in the tank 22.

Of course, still other variations of the specific construction and arrangement of the flow control assembly disclosed above can be made by those skilled in the art without departing from the invention as defined in the appended claims. What is claimed is:

1. A fluid flow control system comprising a tank containing a liquid, a reservoir connected to said tank for permitting the introduction and withdrawal of said liquid to and from said tank to maintain said liquid at a predetermined level in said tank, first conduit means connected to a source of a first fluid and communicating with the interior of said tank at a point above said liquid level, second conduit means communicating with a second fluid and communicating with the interior of said tank at a point below said liquid level so the said liquid normally prevents flow of either of said fluids from one of said conduit means to the other unless the pressure of said first fluid is sufficient to displace said liquid from said tank to said reservoir to the extent that said first conduit means is communicated with said second conduit means, and an inert gas disposed in a portion of said tank not occupied by said liquid for establishing a predetermined fluid pressure in said tank for preventing diffusion of either of said fluids from its respective conduit means through said liquid and into the other conduit means.

2. The system of claim 1 wherein said first fluid is a combustible gas and said second fluid is atmospheric air.

3. The system of claim 2 further comprising at least one burner connected to the end of said second conduit means communicating with said air for combusting said gas.

4. A fluid flow control system comprising a tank containing a liquid, means associated with said tank for permitting the introduction and withdrawal of said liquid to and from said tank to maintain said liquid at a predetermined level in said tank, first conduit means connecting a first fluid with the interior of said tank at a point above said liquid level, second conduit means connecting a second fluid with the interior of said tank at a point below said liquid level so the said liquid normally prevents flow of either of said fluids from one of said conduit means to the other unless the pressure of said first fluid is sufficient to displace said liquid from said tank to said reservoir to the extent that said first conduit means is communicated with said second conduit means, and means independent of said first and second fluids for establishing a predetermined fluid pressure in said tank for preventing diffusion of either of said fluids from its respective conduit means through said liquid and into the other conduit means.

5. The system of claim 4 wherein said first fluid is a combustible gas and said second fluid is atmospheric air.

6. The system of claim 5 further comprising at least one burner connected to the end of said second conduit means communicating with said air for combusting said gas.

* * * * *